CATHODE-TARGET ASSEMBLY FOR RF SPUTTERING APPARATUS

Filed Jan. 22, 1970 2 Sheets-Sheet 1

INVENTORS
WILLIAM C. LESTER
CARLO NUCCIO
ERNEST S. WARD

BY Frank C. Leach Jr.
ATTORNEY

United States Patent Office 3,630,881

Patented Dec. 28, 1971

3,630,881
CATHODE-TARGET ASSEMBLY FOR RF SPUTTERING APPARATUS

William C. Lester, Hopewell Junction, Carlo Nuccio, Poughkeepsie, and Ernest S. Ward, Wappingers Falls, N.Y., assignors to International Business Machines Corporation, Armonk, N.Y.

Filed Jan. 22, 1970, Ser. No. 4,891
Int. Cl. C23c *15/00*
U.S. Cl. 204—298 34 Claims

ABSTRACT OF THE DISCLOSURE

A target of a dielectric material is mounted in spaced relation to a cathode, which is isolated from the sputtering chamber and the anode in the sputtering chamber by the target and its mounting structure. RF energy is transferred from the cathode to the target, which has at least a portion parallel to the anode, through the space by a dielectric coolant, a liquid metal, or a metallic paste. When either the metallic paste or the liquid metal is employed, the cathode is cooled by circulating a coolant such as water therethrough.

In U.S. Pat. 3,369,991 to Davidse et al., there is shown an apparatus using RF power to sputter a dielectric material on a substrate. In the aforesaid Davidse et al. patent, two electrodes having planar surfaces are geometrically arranged with the planar surfaces in a parallel relationship.

To prepare the dielectric target for mounting on a metal cathode, it is necessary to use a three-step metallization process. This process requires initially depositing chrome on the back surface of the dielectric target, then copper, and finally gold. This three-step metallization process requires about five hours because of gradual heating to each of the metallization temperatures and then gradual cooling to avoid thermal stresses.

Furthermore, the subsequent soldering of the metallized back surface of the dielectric target to a metal cathode requires considerable care to avoid hot spots, thermal stresses, and the like when full RF power is applied to the cathode. Additionally, for consistency purposes, it is necessary that the solderer have significant experience.

Accordingly, the mounting of a dielectric target on the planar surface of a cathode is time consuming and expensive. Furthermore, even using the large period of time for fabrication, the soldering problem is such that consistency may not be achieved with a plurality of dielectric targets.

The present invention satisfactorily solves the foregoing problem while still permitting the parallel-plate geometry to be employed. In our copending patent application (IBM Docket F19-68-075) entitled "An Elongated Electrode and Target Arrangement for an RF Sputtering Apparatus and Method of Sputtering," Serial No. 4,825, filed Jan. 27, 1970 and assigned to the same assignee as the assignee of the present application, there is shown another means for avoiding the expensive and time consuming mounting of the dielectric target in a parallel-plate geometry but by using a different electrode and target arrangement than parallel-plate geometry.

The present invention mounts the target in spaced relation to the cathode so that there is no requirement of soldering a dielectric target's back surface to the cathode. Furthermore, the apparatus of the present invention eliminates any requirement for any metallization to transfer RF energy from the cathode to the target. Thus, the present invention not only eliminates the soldering problem but also metallization of the back surface of the dielectric target for transfer of RF energy from the cathode to the target.

In the aforesaid Davidse et al. patent, the spacing between the shield and the cathode is critical in that it must be small enough to suppress the gaseous discharge at the otherwise exposed surfaces of the metal cathode but large enough that a significant capacitive coupling of the RF voltage input to electrical ground does not occur. This spacing between the shield and the metal catthode also must be smaller than the thickness of the space charge sheath, which is formed at the target surface due to the RF gaseous discharge mechanism. The thickness of the space charge sheath is inversely proportional to the pressure of the sputtering gas. As a result, there is an inherent restriction to low pressure operation of about twenty microns or less in the parallel-plate geometry of the aforesaid Davidse et al. patent.

The use of the shield also requires frequent cleaning to minimize flaking of the target. Thus, not only must the spacing be controlled but the shield cleaning requires down time of the sputtering apparatus.

When using the parallel-plate geometry of the aforesaid Davidse et al. patent, there is a significant edge loss of sputtered material; this is only reduced by decreasing the spacing between the target and the substrate holder anode. While any desired electrode spacing between the cathode-target and the anode can be mechanically made, the gaseous discharge mechanism requires the pressure to be increased as the spacing between the cathode-target and the anode is decreased. However, any significant pressure increase to decrease the significant edge loss is opposed by the restriction to low pressure operation that is imposed due to the spacing of the cathode and the shield.

The present invention satisfactorily solves the foregoing problems by eliminating the need for a shield. Thus, in the present invention, the target is supported in surrounding relation to the cathode so that the target isolates the cathode from the sputtering chamber and the anode. Therefore, there is no requirement for a shield when employing the cathode-target assembly of the present invention.

Accordingly, by eliminating the shield, there is no requirement that a sputtering chamber, which uses the parallel-plate geometry, be maintained at a low pressure of about twenty microns or less. Thus, a wider pressure range in the sputtering chamber is available when using the cathode-target assembly of the present invention. Accordingly, by using a higher pressure within the partially evacuated chamber, the edge loss problem can be negated.

The present invention employs an arrangement in which the target is supported in spaced relation to the cathode with the RF energy being transferred from the cathode to the target through the space therebetween by either flowing a dielectric coolant through the space or employing a material, which is capable of both transferring RF energy from the cathode to the target as well as transferring heat from the target to the cathode, in the space and cooling the cathode. If the material is a liquid metal, for example, it could be mercury if the cathode were formed of copper or gallium if the cathode were formed of molybdenum, for example. This selection of a particular liquid metal in conjunction with the material of the cathode provides an increased effective heat transfer from the target to the cathode and avoids any adverse chemical reaction of the liquid metal with the metal cathode.

An object of this invention is to provide a simplified cathode-target assembly for an RF sputtering apparatus having a parallel-plate geometry.

Another object of this invention is to provide a cathode-target assembly in which the cathode is surrounded by the target and disposed in spaced relation thereto.

The foregoing and other objects, features, and advantages of the invention will be more apparent from the following more particular description of the preferred embodiments of the invention as illustrated in the accompanying drawings.

Figure 1:
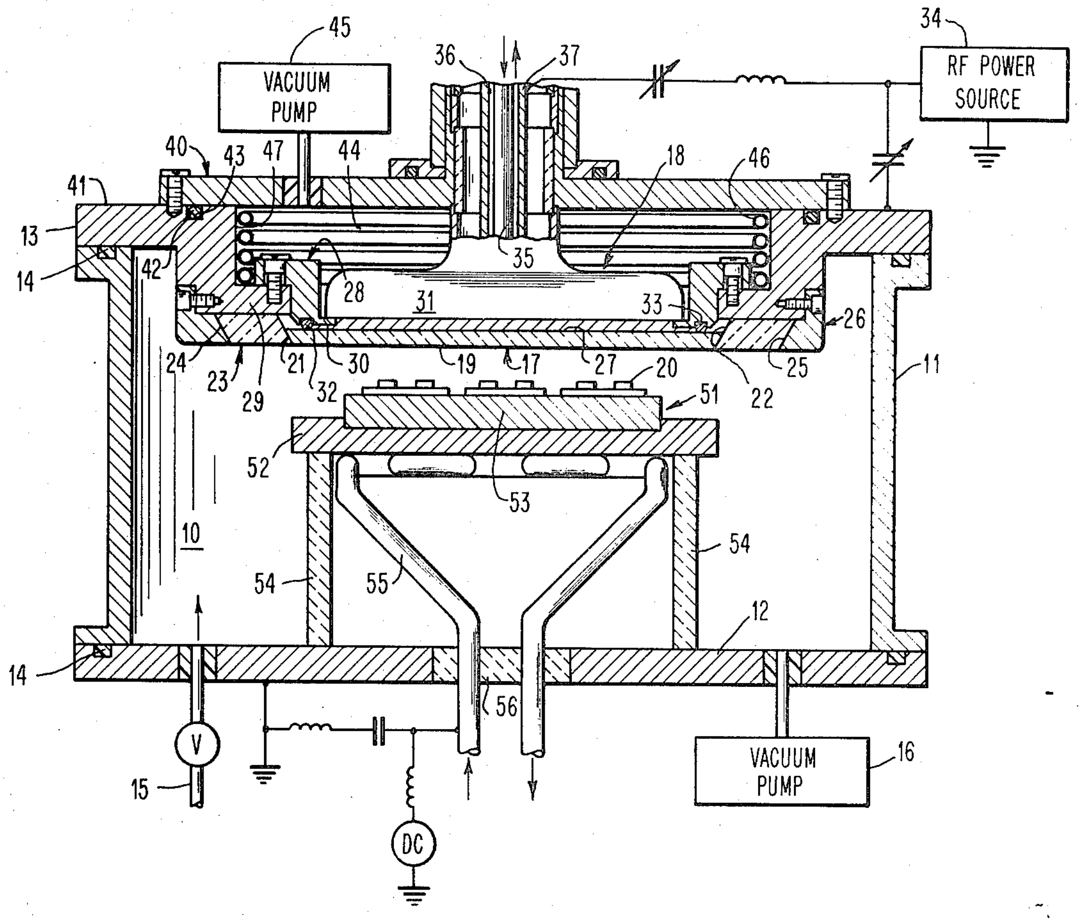
FIG. 1 is a vertical sectional view of a sputtering chamber in which one form of the cathode-target assembly of the present invention is employed.

Referring to the drawings and particularly FIG. 1, there is shown an RF sputtering apparatus in which the cathode-target assembly of the present invention may be employed. The RF sputtering apparatus includes a gas ionization chamber 10, which is formed within a cylindrical member 11 of an electrically conductive material, an electrically conductive base plate 12, and an electrically conductive top plate 13. Annular seals 14 are utilized to insure a tight seal between the base plate 12 and the cylindrical member 11 and between the top plate 13 and the cylindrical member 11.

A suitable inert gas such as argon, for example, is supplied to the chamber 10 from a suitable source by a conduit 15. The gas is maintained at the desired pressure within the chamber 10 by a vacuum pump 16, which communicates with the interior of the chamber 10.

The chamber 10 has a cathode-target assembly 17 supported by the top plate 13. The cathode-target assembly 17 includes a cathode 18 and a target 19, which is formed of the material that is to be sputtered onto a plurality of substrates 20.

The target 19, which is preferably formed of a suitable dielectric material such as quartz, for example, has a beveled or inclined outer surface 21 resting against a cooperating beveled or inclined inner surface 22 tof a support ring 23, which is formed of a suitable dielectric material such as quartz, for example. The ring 23 has a beveled or inclined outer surface 24 inclined at an angle that results in the surface 24 being substantially parallel to the surface 21 of the target 19.

The outer surface 24 of the support ring 23 rests on an inner surface 25 of a clamping ring 26, which is fixed to the top plate 13 and formed of an electrically conductive material. Accordingly, the target 19 is supported from the top plate 13.

The cathode 18 is disposed in spaced relation to the upper surface of the cathode 19 to form a gap or space 27 therebetween The gap 27 is filled with a material, which is a good heat transfer medium, a good electrical energy transfer medium, and non-solidifying. The material also must have a low vapor pressure and present no problem when disposed in a partial vacuum. The material can be a liquid metal or a metallic paste having the foregoing properties. Suitable examples of the liquid metal are gallium arsenic and mercury. One suitable example of the metallic paste is a paste formed of silver.

To retain the material within the gap 27, a continuous ring 28, releasably fixed and spring-mounted to a flange 29 on the top plate 13, provides sufficient sealing (non-vacuum) against the backside of the target 19 via controllable compression of an O-ring 32 housed in an annular groove 33 in the lower surface of the ring 28. An inwardly projecting flange 30 of the ring 28, which has a smaller inner diameter than the outer diameter of body 31 of the cathode 18, serves as a physical stop for the cathode 18 upon insertion into the target assembly. Accordingly, when the cathode body 31 rests on the flange 30 of the ring 28, the physical dimension of the space 27 is repeatedly and reliably controlled and the liquid metal or metallic paste is thus given complete confinement within the space 27.

Accordingly, the material within the gap 27 is positively retained therein so that the material cannot flow between the outer surface 21 of the target 19 and the inner surface 22 of the ring 23 whereby the material could enter the chamber 10. Thus, with the material having the desired characteristics of good heat transfer and good electrical transfer, RF energy, which is supplied to the cathode 18 from an RF power source 34, is readily transferred to the target 19 from the cathode 18 and the target 19 is cooled by heat transfer to the cathode body 31 through the material in the gap 27.

The cathode body 31 is cooled by a coolant, which is supplied to the cathode body 31 through an inner tube 35 of the cathode 18. The coolant, which can be water, for example, exits from the cathode body 31 through an annular passage 36, which is formed between the outer surface of the inner tube 35 of the cathode 18 and the inner surface of a surrounding tube 37 of the cathode 18. Thus, by circulating the coolant through the cathode body 31, the target 19 is maintained at the desired temperature.

A plate 40 is supported on an upper surface 41 of the top plate 13 of the RF sputtering apparatus and is fixed thereto. An O-ring 42, which is supported in an annular groove 43 in the top plate 13, forms a seal between the top plate 13 and the plate 40 to provide a vacuum chamber 44 within which the cathode body 31 is disposed. The desired vacuum pressure within the chamber 44 is maintained by a vacuum pump 45, which communicates with the interior of the chamber 44.

Synchronized vacuum pumping of the chambers 10 and 44 is necessary so that the target 19 experiences no significant differential pressure during the entire system operation such as during initial pumpdown from atmosphere, backfill to process pressure in the chamber 10, deposition or sputtering process, and venting the chamber 10 to atmosphere for unloading substrates. This synchronized vacuum pumping is accomplished by tie-in or intercontrol of the two separate vacuum pumps 16 and 45 or by a single vacuum pump via suitable, sequential valving which is the state of the art in vacuum technology.

A plurality of cooling coils 46 is disposed within the chamber 44 and supported along an inner wall 47 of the top plate 13. By circulating a coolant such as water, for example, through the coils 47, the chamber 44 is maintained at the desired temperature. This aids in cooling the cathode-target assembly 17 along with the coolant circulating through the tube 35 and the annular passage 36.

As previously mentioned, the substrates 20 have the material from the target 19 sputtered thereon when RF power is supplied to the cathode 18 from the RF power source 34. The substrates 20 are supported beneath the target 19 on a substrate holder 51, which comprises a support plate 52 and an insert plate 53. The insert plate 53 is seated in a recess in the support plate 52.

The support plate 52 of the substrate holder 51 is supported in spaced relation to the base plate 12 by legs 54, which may be formed of an insulating material or a conductive material. If formed of an insulating material, the substrate holder 51 is electrically insulated from the base plate 12.

An electrode and cooling coil 55 makes electrical contact with the support plate 52 and also provides means to control the temperature of the support plate 52, the insert plate 53, and the substrates 20. The coil 55 is introduced into the chamber 10 through an insulating seal 56 in the base plate 12. The temperature of the support plate 52, which is the substrate holder electrode and functions as the anode, is maintained by circulating water or other coolant through the coil 55 as indicated by the arrows in FIG. 1.

Figure 2:
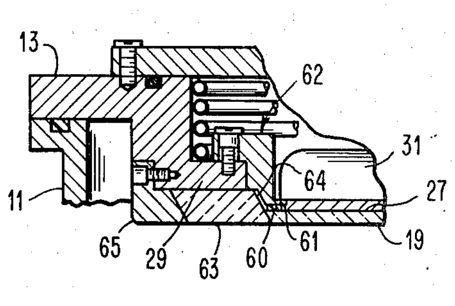
FIG. 2 is a fragmentary vertical sectional view showing another mounting arrangement for the target of the cathode-target assembly and for preventing the heat and electrical transfer means between the target and the cathode from entering the sputtering chamber.

Referring to FIG. 2, there is shown another form of retaining the material within the gap 27 between the target 19 and the cathode body 31 to prevent the material from entering the chamber 10. As shown in FIG. 2, a gasket 60, which is formed of a suitable plastic such as Viton, for example, is utilized to retain the material within the gap 27 from flowing between the upper surface of the target 19 and the lower surface of a flange 61 of a continuous ring 62, which replaces the ring 28 of FIG. 1 and is releasably fixed to the flange 29 of the top plate 13.

The ring 62 differs from the ring 28 in that a portion of a target retaining ring 63, which is similar to the ring 23 and formed of a suitable dielectric material such as quartz, for example, extends beneath the ring 62. Accordingly, the ring 62 must have its lower surface formed to accommodate a beveled or inclined surface 64 of the ring 63. A clamping ring 65 cooperates with the ring 63 to support the ring 63 in the same manner as the ring 26 cooperates with the ring 22 in FIG. 1.

Thus, the material in the gap 27 is controlled so as to be prevented from entering the sputtering chamber 10. The gasket 60, via controllable compression from the spring-mounted ring 62, insures that the material cannot flow outwardly to where the material could enter between the outer surface 21 of the target 19 and the inner surface 64 of the ring 63.

It should be understood that the remainder of the apparatus of FIG. 2 is the same as the apparatus of FIG. 1. Therefore, it is not shown or described.

Figure 3:
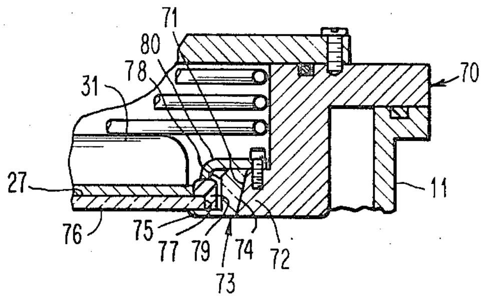
FIG. 3 is a fragmentary vertical sectional view showing a further mounting arrangement for the target of the cathode-target assembly and for preventing the heat and electrical transfer means between the target and the cathode from entering the sputtering chamber.

Referring to FIG. 3, there is shown another target mounting arrangement for preventing the material within the gap 27 from entering the sputtering chamber 10. In this arrangement, the top plate 13 of FIG. 1 is replaced by a top plate 70, which is formed with an inclined or beveled inner surface 71 on a lower flange 72. A continuous ring 73 has its inclined or beveled outer surface 74 engaging the inner surface 71 of the flange 72 whereby the ring 73 is supported by the top plate 70.

The ring 73 has a continuous lower inner flange 75 to support a target 76 thereon. The target 76 is the same as the target 19 except that its outer surface 77 is straight rather than beveled as the outer surface 21 of the target 19 is.

The outer surface 77 of the target 76 is space from inner surface 78 of the ring 73 to receive an annular seal 79 therebetween. The annular seal 79 has a substantially L-shaped cross section so that one leg is disposed in the space between the outer surface 77 of the target 76 and the inner surface 78 of the ring 73 while its other leg rests on the upper surface of the target 76.

The seal 79, which is formed of a suitable plastic such as Viton, for example, has a plurality of retainers 80, which are releasably fixed to the top plate 70, engaging thereagainst. This insures that the material in the gap 27 cannot flow between the top surface of the target 76 and the lower surface of the seal 79 and/or between the lower surface of the target 76 and the upper surface of the flange 75 of the ring 73. Thus, the material in the gap 27 is prevented from entering the chamber 10.

The remainder of the apparatus of FIG. 3 is the same as that of FIG. 1. Therefore, it will not be shown or described.

Figure 4:
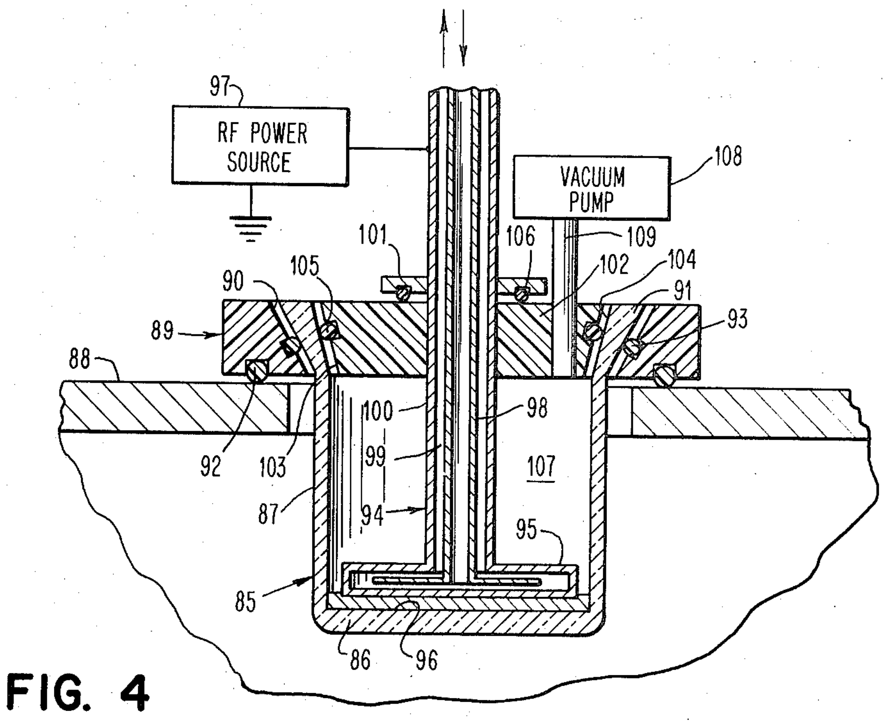
FIG. 4 is a vertical sectional view of another embodiment of the cathode-target assembly of the present invention.

Referring to FIG. 4, there is shown another form of the invention in which a target 85 is cup-shaped and includes a disc 86 supported by a hollow cylindrical tube

87. The target 87 is supported from a top plate 88 of a sputtering chamber by a continuous ring 89. The ring 89, which is formed on an electrically insulating material such as Teflon, for example, has an inclined or beveled inner surface 90 against which a substantially parallel outer surface of an enlarged head 91 of the target 85 rests. The ring 89 is fixed to the top plate 88 by suitable means such as bolts, for example.

An O-ring 92 is disposed between the upper surface of the top plate 88 and the lower surface of the ring 89 to form a seal therebetween. An O-ring 93 is positioned between the inclined inner surface 90 of the ring 89 and the inclined outer surface of the enlarged head 91 to form a seal therebetween. Accordingly, the O-rings 92 and 93 function to insure that there is no leakage therebetween to affect the vacuum pressure of the chamber.

A cathode 94 is disposed within the target 85. The cathode 94 has its body 95 positioned in spaced relation to the inner or back surface of the disc 86 of the target 85 to form a gap 96 therebetween. The gap 96 is filled with a material having the same properties as the material which filled the gap 27 in the embodiment of FIG. 1. Thus, the material is capable of both transferring heat from the disc 86 to the cathode 94 and electrical energy from the cathode 94 to the disc 86.

Because of the shape of the cathode body 95, RF energy from an RF power source 97 is supplied only to the disc 86 and the lower portion of the support tube 87 of the target 85. Therefore, sputtering occurs primarily from the flat disc 86, which has the sputtering surface parallel to the anode.

The cathode 94 is cooled by circulating a coolant such as water, for example, through an inner tube 98 of the cathode 94 into the body 95. The coolant flows from the body 95 through an annular passage 99, which is formed between the outer surface of the inner tube 98 and the inner surface of an outer tube 100.

The outer tube 100 of the cathode 94 has a continuous ring 101 fixed thereto and supported on a continuous ring 102, which is formed of electrically insulating material such as Teflon, for example. The ring 102 has an inclined outer surface 103, which is supported by inner surface 104 of the target enlarged head 91.

An O-ring 105 is disposed between the enlarged head 91 of the target 85 and the ring 102 to form a seal therebetween. An O-ring 106 is positioned between the lower surface of the ring 101 and the upper surface of the ring 102 to form a seal therebetween. Accordingly, the O-rings 105 and 106 cooperate to seal a chamber 107, which is formed within the target 85. Thus, the chamber 107 can be subjected to a partial vacuum when a vacuum pump 108 applies a vacuum thereto through a conduit 109.

It should be understood that the remainder of the apparatus of FIG. 4 will be the same as the apparatus of FIG. 1. Therefore, the remainder of the apparatus of FIG. 4 will not be shown or described.

Figure 5:
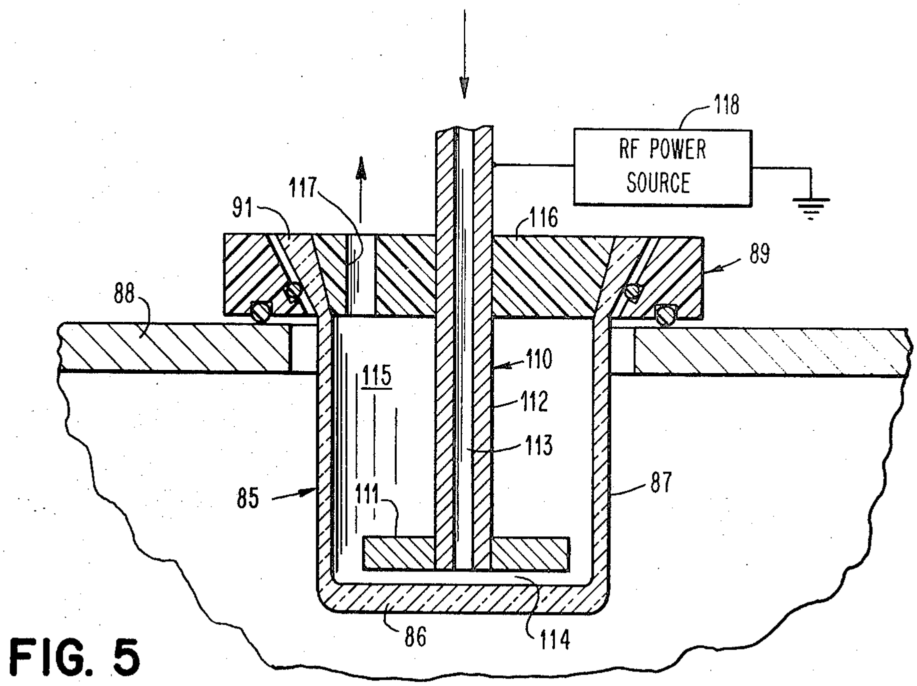
FIG. 5 is a vertical sectional view of a further modification of the cathode-target assembly of the present invention.

Referring to FIG. 5, there is shown another modification of the present invention in which the target 85 is mounted on the top plate 88 in the same manner as in FIG. 4. However, a cathode 110 replaces the cathode 94. The cathode 110 has its body 111 mounted in spaced relation to the disc 86 of the target 85 and to the lower portion of the tube 87 of the target 85.

The cathode body 111 has a tubular extension 112 connected thereto. A dielectric coolant flows through an axial bore 113 in the tubular extension 112 and then passes into a gap 114, which is between the inner or back surface of the disc 86 and the lower surface of the cathode body 111. From the gap 114, the coolant flows into a chamber 115, which is formed by a plug 116 being disposed at the upper end of the target 85 and supported by the enlarged head 91 of the target 85.

The plug 116 is formed of a material, which is compressible, electrically insulated, and does not allow water to pass therethrough. One suitable example of the material of the plug 116 is Teflon.

The plug 116 has a passage 117 theein to allow the dielectric coolant to flow from the chamber 115. The dielectric coolant, which flows through the bore 113 in the hollow tubular extension 112 to the gap 114 and from the gap 114 through the chamber 115 to the passage 117, must be capable of both transferring heat from the target 85 to the cathode 110 and of transferring RF power from the cathode 110, which receives its RF power from an RF power source 118, to the target 85. One suitable example of the dielectric coolant is deionized water.

It should be understood that the remainder of the apparatus of FIG. 5 is the same as that of the apparatus of FIG. 1. Accordingly, the remainder of the apparatus of FIG. 5 will not be shown or described.

An advantage of this invention is that a parallel-plate geometry for an RF sputtering apparatus may be employed without a cathode shield. Another advantage of this invention is that the time required to make the apparatus is substantially reduced. A further advantage of this invention is that its fabrication cost is substantially lower than presently available parallel-plate geometry for an RF sputtering apparatus.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An RF sputtering apparatus including:
a partially evacuated chamber;
an anode disposed within said chamber;
a target disposed within said chamber and in spaced relation to said anode;
said target having at least a portion thereof substantially parallel to said anode;
a cathode disposed in spaced relation to said target and shielded from said anode by said target and means to support said target and cooperating with said target to enclose said cathode;
and said cathode is disposed in close but spaced relation only to said target;
means to apply a high frequency alternating voltage to said cathode and said anode;
and liquid or liquifiable means disposed at least in the space between said target and said cathode to transfer electrical energy from said cathode to said target to sputter material from said target.

2. The apparatus according to claim 1 in which said transfer means cools said target.

3. The apparatus according to claim 2 in which:
said cooling and transfer means includes liquid metal means disposed between said cathode and said target, said liquid metal means being in contact with said cathode and said target;
and means circulates a coolant through said cathode to cool said target by heat transfer through said liquid metal means.

4. The apparatus according to claim 3 including means to control said liquid metal means between said target and said cathode so that said liquid metal means cannot enter said chamber.

5. The apparatus according to claim 3 in which said target is a dielectric material.

6. The apparatus according to claim 2 in which:
said cooling and transfer means includes a liquid paste disposed between said cathode and said target and in contact therewith;
and means circulates a coolant through said cathode to cool said target by heat transfer through said liquid paste.

7. The apparatus according to claim 6 including means to control said liquid paste between said target and said cathode so that said liquid paste cannot enter said chamber.

8. The apparatus according to claim 6 in which said target is a dielectric material.

9. The apparatus according to claim 2 in which:
said target comprises:
a disc having material to be sputtered, said disc having a flat surface parallel to said anode.

10. The apparatus according to claim 9 in which:
said support means includes:
a ring having means to support said disc;
and means to support said ring and secured to a wall of said chamber.

11. The apparatus according to claim 9 in which said support means is formed integral with said disc.

12. The apparatus according to claim 9 in which said support means is formed of the same material as said disc.

13 The apparatus according to claim 9 in which said target is a dielectric material.

14. The apparatus according to claim 2 in which said cooling and transfer means includes means to supply a dielectric coolant between said cathode and said target.

15. The apparatus according to claim 14 in which said target is a dielectric material.

16. The apparatus according to claim 1 including means to prevent any significant pressure differential across said target during operation.

17. The apparatus according to claim 16 including:
means to form a second chamber in which said target forms a wall thereof, said second chamber having the portion of said cathode adjacent said target therein;
and means to cause synchronized vacuum pumping of said chambers.

18. The apparatus according to claim 1 in which said target is a dielectric material.

19. A cathode-target assembly for use in an RF sputtering apparatus having electrodes in a parallel plate configuration comprising:
a target for at least partial disposition within a partially evacuated chamber;
a cathode disposed in spaced relation to said target and shielded by said target from the chamber when said target is disposed within the chamber;
said target having at least a portion thereof disposed parallel to an anode in the chamber when said target is disposed in the chamber and means to support said target and cooperating with said target to enclose said cathode;
and said cathode is disposed in close but spaced relation only to said target;
and liquid or liquifiable means disposed at least in the space between said target and said cathode to transfer RF electrical energy from said cathode to said target.

20. The assembly according to claim 19 in which said transfer means cools said target.

21. The assembly according to claim 20 in which:
said target includes:
a disc having material to be sputtered, said disc having a flat surface for disposition parallel to an anode in the chamber when said target is disposed in the chamber.

22. The assembly according to claim 21 in which said support means is formed integral with said disc.

23. The assembly according to claim 21 in which said support means is formed of the same material as said disc.

24. The assembly according to claim 20 in which:
said cooling and transfer means includes liquid metal means disposed between said cathode and said target and in contact therewith;
and means circulates a coolant through said cathode to cool said cathode by heat transfer through said liquid metal means.

25. The assembly according to claim 24 including means to control said liquid metal means between said target and said cathode so that said liquid metal means cannot enter the chamber when said target is disposed in the chamber.

26. The assembly according to claim 24 in which said target is a dielectric.

27. The assembly according to claim 20 in which:

said cooling and transfer means includes a liquid paste disposed between said cathode and said target and in contact therewith;

and means circulates a coolant through said cathode to cool said cathode by heat transfer through said liquid paste.

28. The assembly according to claim 27 including means to control said liquid paste between said target and said cathode so that said liquid paste cannot enter the chamber when said target is disposed in the chamber.

29. The assembly according to claim 27 in which said target is a dielectric.

30. The assembly according to claim 20 in which said cooling and transfer means includes means to supply a dielectric coolant between said target and said cathode.

31. The assembly according to claim 30 in which said target is a dielectric.

32. The assembly according to claim 20 in which said target is a dielectric.

33. The assembly according to claim 19 in which said target is a dielectric.

34. The assembly according to claim 19 including means to prevent any significant pressure differential across said target during operation.

References Cited

UNITED STATES PATENTS

| | | | |
|---|---|---|---|
| 3,235,476 | 2/1966 | Boyd et al. ---------- | 204—192 |
| 3,250,694 | 5/1966 | Maissel et al. -------- | 204—192 |
| 3,294,661 | 12/1966 | Maissel ------------ | 204—192 |
| 3,347,772 | 10/1967 | Laegreid et al. ------ | 204—298 |
| 3,428,546 | 2/1969 | Baum et al. -------- | 204—298 |

JOHN H. MACK, Primary Examiner

S. S. KANTER, Assistant Examiner

U.S. Cl. X.R.

204—192